Patented Sept. 27, 1949

2,483,250

UNITED STATES PATENT OFFICE 2,483,250

PRODUCTION OF NEW DERIVATIVES OF PYRIDINE-3-CARBOXYLIC ACID

Hans Suter, Schaffhausen, Switzerland, assignor to Cilag Limited, Schaffhausen, Switzerland No Drawing. Application August 31, 1946, Serial No. 694,431. In Switzerland September 15, 1945

2 Claims. (Cl. 260—295.5)

The subject matter of the invention is a process for the production of compounds of the general formula

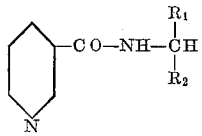

in which $R_1$ and $R_2$ denote hydrogen, alkyl, hydroxyalkyl, alkoxyalkyl, phenoxyalkyl, dialkylaminoalkyl, aryl, aralkyl, hydroxyaryl, alkoxyaryl, hydroxyaralkyl or alkoxyaralkyl, radicals or $R_1$ and $R_2$ denote together a single bivalent radical of an alkane, alkyl ether, alkyl amine, dialkyl amine, aralkane, aralkanol, aralkyl amine, hydroxyaralkane or alkoxyaralkane. The compounds of this general formula have proved to be valuable therapeutic substances. They have, inter alia, good spasmolytic properties and are to be employed especially for suppressing neurogenic and myogenic spasms.

The invention also covers the aforesaid new compounds.

The process for the production of these new derivatives of pyridine-3-carboxylic acid is characterized by the feature that a compound, which contains the radical of nicotinic acid, e. g., nicotinic acid, its anhydride, a nicotinyl halide or an ester of nicotinic acid, is caused to act upon an amine of the general formula

in which $R_1$ and $R_2$ have the meaning given above, the nicotinamide corresponding to the amine being formed. Especially efficacious compounds are obtained by employing the following amines: amino - diphenylmethane, amino - $\alpha,\beta$ - diphenylethane, $\alpha$-amino-$\beta$-hydroxy-$\alpha,\beta$-diphenyl-ethane, tetrahydro-$\beta$-naphthylamine, 1-amino-acenaphthene, 1-hydroxy-2-amino-acenaphthene, amino-1:1'- diphenyl- 2:2'- $\alpha,\beta$- ethane, $\alpha$-amino- $\beta$- hydroxy-1:1'-diphenyl-2:2'-$\alpha,\beta$-ethane, 10-amino-9:10-dihydroanthracene, 9-hydroxy-10-amino-9:10-dihydroanthracene and 9-amino-fluorene.

Example 1

51.1 gms. of freshly calcined potassium carbonate are added, slowly and while stirring, to 32.7 gms. of nicotinyl chloride hydrochloride and 42 gms. of aminodiphenylmethane in 250 ccs. of absolute benzene. The mixture is boiled for 9 hours under the reflux condenser and the undissolved matter is filtered off and recrystallised from ethanol. Yields 57.3 gms. = 86.4% of the theoretical. The nicotinyl - amino - diphenylmethane obtained in this way crystallises in colourless needles which melt at 175–180° C. It is readily soluble in chloroform, acetone and methanol, moderately soluble in ethanol, slightly soluble in benzene and ether and insoluble in water.

Example 2

A mixture of 36 gms. of nicotinic acid and 57.5 gms. of amino-$\alpha,\beta$-diphenyl-ethane in 300 ccs. of cumene is heated at its boiling point, so that cumene and the water formed in the reaction distil slowly into a receiver which allows the volume of the distillate to be measured. As soon as the bottom aqueous layer amounts to 5.2 ccs., the remaining cumene is distilled off in vacuo and the residue, which consists of nicotyl-amino-$\alpha,\beta$-diphenyl-ethane, is recrystallised from ethanol. The new compound forms colourless clusters of needle-shaped crystals having a melting point of 159° C. It is readily soluble in 5 N-hydrochloric acid, moderately soluble in methanol, acetone, ether and benzene, slightly soluble in ethanol and insoluble in water and in alkalis.

Example 3

44.35 gms. of freshly calcined potassium carbonate are added to a mixture of 28.44 gms. of nicotinyl chloride hydrochloride, 34.23 gms. $\alpha$-amino-$\beta$-hydroxy-$\alpha,\beta$-diphenyl-ethane and 200 ccs. of absolute alcohol. The whole is boiled for 11 hours under the reflux condenser and, then, after cooling, the undissolved matter is filtered off and recrystallised from ethanol. $\alpha$-nicotinyl-amino-$\beta$-hydroxy-$\alpha,\beta$-diphenyl-ethane are obtained in this way in colourless needles having a melting point of 223° C. The new compound is readily soluble in acetone and pyridine, slightly soluble in ether, benzene, glacial acetic acid and ethanol and insoluble in water.

Example 4

17 gms. of nicotinic acid, 20 gms. of tetrahydro-$\beta$-naphthylamine and 100 ccs. of xylene are heated together so that water produced in the reaction and a small quantity of xylene distil off. After 2.4 gms. of water have collected in the receiver, the remainder is evaporated to dryness in vacuo and the residue is recrystallised from ethanol. The nicotinyl-tetrahydro-$\beta$-naphthylamide which is obtained in this way crystallises in colourless, small plates which melt at 154° C. Yield:28.9 gms. corresponding to 77.6% of the theoretical. The new amide is readily soluble in acetone, chloroform and pyridine, slightly soluble in ethanol and insoluble in water.

What I claim is:
1. As a medicinal substance, nicotinylamino-α,β-diphenyl-ethane of the formula

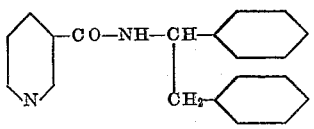

2. A process for the production of nicotinyl-amino-α,β-diphenyl-ethane comprising reacting a compound selected from the group consisting of nicotinic acid, its anhydride and a nicotinyl halide, with amino-α,β-diphenyl-ethane of the formula

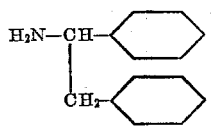

HANS SUTER.

REFERENCES CITED

The following references are of record in the file of this patent:

UNITED STATES PATENTS

| Number | Name | Date |
|---|---|---|
| 1,617,332 | Hartman | Feb. 15, 1927 |

FOREIGN PATENTS

| Number | Country | Date |
|---|---|---|
| 539,178 | Germany | Nov. 12, 1931 |

OTHER REFERENCES

Machek: Monatshefte für Chemie, vol. 72, pp. 81, 82, 83, 91.